United States Patent
Nakamura et al.

(10) Patent No.: US 9,805,459 B2
(45) Date of Patent: Oct. 31, 2017

(54) AXIAL FORCE MEASUREMENT METHOD

(71) Applicant: TOYOTA JIDOSHA KABUSHIKI KAISHA, Toyota-shi, Aichi-ken (JP)

(72) Inventors: Hisanori Nakamura, Toyota (JP); Masahito Sakakibara, Okazaki (JP); Tatsuro Mori, Toyota (JP); Yuichi Hirano, Toyota (JP); Yusuke Matsumoto, Okazaki (JP); Takashi Sakui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/030,788

(22) PCT Filed: Oct. 16, 2014

(86) PCT No.: PCT/IB2014/002129
§ 371 (c)(1),
(2) Date: Apr. 20, 2016

(87) PCT Pub. No.: WO2015/059538
PCT Pub. Date: Apr. 30, 2015

(65) Prior Publication Data
US 2016/0267645 A1    Sep. 15, 2016

(30) Foreign Application Priority Data

Oct. 21, 2013 (JP) ................................. 2013-218632

(51) Int. Cl.
*G06K 9/00* (2006.01)
*G06T 7/00* (2017.01)
(Continued)

(52) U.S. Cl.
CPC .......... *G06T 7/0006* (2013.01); *G01L 5/0038* (2013.01); *G06T 7/66* (2017.01); *G06T 2207/30164* (2013.01)

(58) Field of Classification Search
CPC ............... G06T 7/0006; G06T 7/606; G06T 2207/30164; G06T 7/66; G01L 5/0038;
(Continued)

(56) References Cited

U.S. PATENT DOCUMENTS

| 8,488,185 B2* | 7/2013 | Iijima | B41J 19/20 358/1.5 |
|---|---|---|---|
| 2011/0061616 A1* | 3/2011 | Watanabe | F01L 1/02 123/90.15 |

FOREIGN PATENT DOCUMENTS

| CN | 102589461 A | 7/2012 |
| JP | 2004-093362 A | 3/2004 |

(Continued)

OTHER PUBLICATIONS

Nitta et al.; "A Measurement Method of Bolt Loads Based on Deformation of a Top Surface of a Bolt Head;" Transactions of the Japan Society of Mechanical Engineers; C 73(733); pp. 2612-2618.

*Primary Examiner* — Ruiping Li
(74) *Attorney, Agent, or Firm* — Oliff PLC

(57) ABSTRACT

An axial force measurement method includes: a step of calculating an average value of the height of pixels positioned inside a minimum circle, which is centered on a gravity center position of a head, as a minimum point; a step of extracting pixels with a relatively large height from the pixels on the basis of a pixel value of the pixels and calculating an average value of the height of the extracted pixels as a maximum point; a step of calculating a displacement amount of the head on the basis of a difference between the minimum point and the maximum point; and a step of calculating an axial force by substituting the displacement (Continued)

amount of the head into a relational expression of an axial force and the displacement amount of the head.

5 Claims, 16 Drawing Sheets

(51) Int. Cl.
*G01L 5/00* (2006.01)
*G06T 7/66* (2017.01)

(58) Field of Classification Search
CPC .......... F41A 21/12; F42B 35/00; F42B 5/025; B65G 19/287; B65G 19/28
USPC ........................................................ 382/152
See application file for complete search history.

(56) References Cited

FOREIGN PATENT DOCUMENTS

| | | |
|---|---|---|
| JP | 2005-297133 A | 10/2005 |
| JP | 2011-179952 A | 9/2011 |
| JP | 2013-113696 A | 6/2013 |

\* cited by examiner

F I G . 12
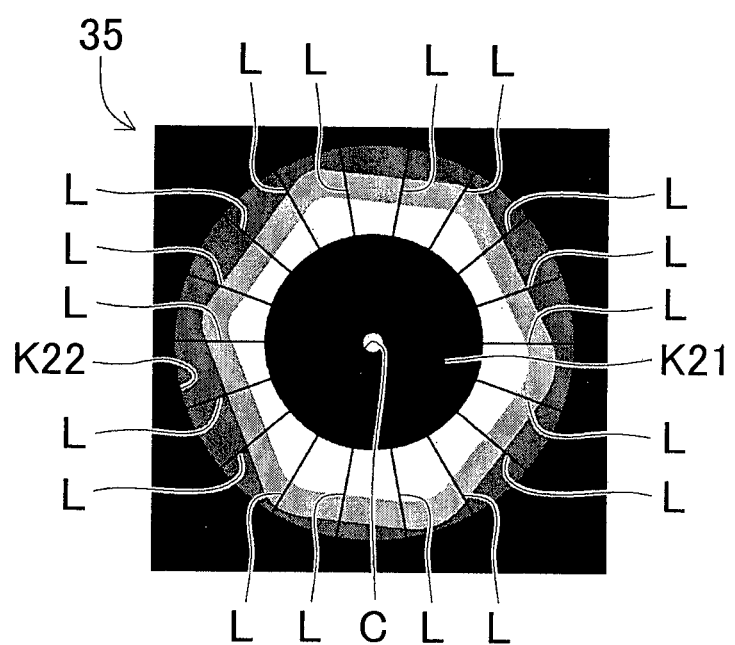

AXIAL FORCE MEASUREMENT METHOD

BACKGROUND OF THE INVENTION

1. Field of the Invention

The invention relates to an axial force measurement method for measuring an axial force of a bolt fastened to an object to be fastened.

2. Description of Related Art

The axial force of a bolt fastened to an object to be fastened is measured to, for example, verify the fastened state of the bolt. There is a correlation between the axial force and the displacement amount of the bolt head (that is, the difference in the recession amount of the head between the states before and after fastening). Therefore, the axial force is typically measured by acquiring the correlation between the axial force and the displacement amount of the head in advance, measuring the displacement amount of the head when actually measuring the axial force, and then measuring the axial force on the basis of the correlation.

In "A Measurement Method of Bolt Loads Based on Deformation of a Top Surface of a Bolt Head", Transactions of the Japan Society of Mechanical Engineers. C 73(733), 2612-2618, the surface shape of the head is measured and the displacement amount of the head is measured on the basis of the difference between the displacement amount of the center (of gravity) of the head and the displacement amount of both ends. In "A Measurement Method of Bolt Loads Based on Deformation of a Top Surface of a Bolt Head", Transactions of the Japan Society of Mechanical Engineers. C 73(733), 2612-2618, the measurement results on the surface shape of the head are approximated by a six-order polynomial, and the displacement amount of the head is calculated from the approximation result in order to suppress the error in calculation of the displacement amount of the head caused by irregularity resulting from surface roughness.

However, in this case, it is not unlikely that the measurement results on the displacement amount at both ends cannot be accurately approximated, that is, the end portions obtained by approximation cannot be accurate. Therefore, with the technique disclosed in "A Measurement Method of Bolt Loads Based on Deformation of a Top Surface of a Bolt Head", Transactions of the Japan Society of Mechanical Engineers. C 73(733), 2612-2618, the displacement amount of the head cannot be measured accurately. As a result, it is not unlikely that the axial force cannot be measured accurately.

Further, with the technique disclosed in "A Measurement Method of Bolt Loads Based on Deformation of a Top Surface of a Bolt Head", Transactions of the Japan Society of Mechanical Engineers. C 73(733), 2612-2618, the displacement amount of the head is measured from the displacement amount in three locations, namely, in the center and at both ends of the head. Therefore, with the technique disclosed in "A Measurement Method of Bolt Loads Based on Deformation of a Top Surface of a Bolt Head", Transactions of the Japan Society of Mechanical Engineers. C 73(733), 2612-2618, where the measurement locations at both ends of the head are changed, the measurement results for the displacement amount of the head can change under the effect of the surface roughness of the head or irregularity formed at the head, even when the axial force is the same. In other words, with the technique disclosed in "A Measurement Method of Bolt Loads Based on Deformation of a Top Surface of a Bolt Head", Transactions of the Japan Society of Mechanical Engineers. C 73(733), 2612-2618, it is not unlikely that the axial force cannot be measured stably.

SUMMARY OF THE INVENTION

The invention provides an axial force measurement method by which an axial force can be measured accurately and stably.

According to an aspect of the invention, an axial force measurement method for measuring an axial force of a bolt fastened to an object to be fastened includes: acquiring a distance image with a height as a pixel value by measuring a height of the head of the bolt with a distance sensor; calculating a gravity center position of the head of the bolt by subjecting the distance image to binarization processing to acquire a binarized image and extracting an image of the head of the bolt from the binarized image; calculating an average value of a height of pixels positioned inside a minimum circle as a minimum point by subjecting the distance image to mask processing and extracting only pixels positioned inside the minimum circle centered on the gravity center position of the head of the bolt; calculating an average value of the height of extracted pixels with a relatively large height as a maximum point by extracting pixels with the relatively large height from the pixels of the distance image on the basis of pixel value of the pixel; calculating a displacement amount of the head of the bolt on the basis of a difference between a calculation result on the minimum point and a calculation result on the maximum point; and calculating an axial force by substituting the calculation result on the displacement amount of the head of the bolt into a pre-calculated relational expression of an axial force and the displacement amount of the head of the bolt.

In the axial force measurement method, when the maximum point is calculated, the pixels with the relatively large height may be extracted on the basis of the pixel value of the extracted pixel by extracting pixels positioned on virtual straight line from the distance image, the virtual straight line extending at a constant angular interval from the gravity center position of the head of the bolt toward the outside of the bolt.

In the axial force measurement method, when the maximum point is calculated, pixels may be extracted by subjecting the distance image to mask processing, the pixels to be extracted being positioned outside a first circle which is centered on the gravity center position of the head of the bolt, the first circle being larger than the minimum circle, and the pixels to be extracted also being positioned inside a second circle which is centered on the gravity center position of the head of the bolt, the second circle being larger than the first circle, and the pixels positioned on the virtual straight lines may be extracted from among the extracted pixels.

In the axial force measurement method, when the maximum point is calculated, pixels may be extracted as pixels with the relatively large height from the pixels by subjecting the distance image to mask processing, the pixels to be extracted being positioned outside a first circle which is centered on the gravity center position of the head of the bolt, first circle being larger than the minimum circle, and also positioned inside a second circle which is centered on the gravity center position of the head of the bolt, the second circle being larger than the first circle and the second circle being smaller than the head of the bolt.

In the axial force measurement method, the minimum circle may be smaller than a recess of the head of the bolt, the recess being formed in the gravity center position of the head of the bolt.

The effect demonstrated according to the aspect of the invention is that the axial force can be measured accurately and stably.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 illustrates a plurality of virtual straight lines and a mask image;

DETAILED DESCRIPTION OF EMBODIMENTS

The axial force measurement method according to the first embodiment will be described below.

Figure 1:
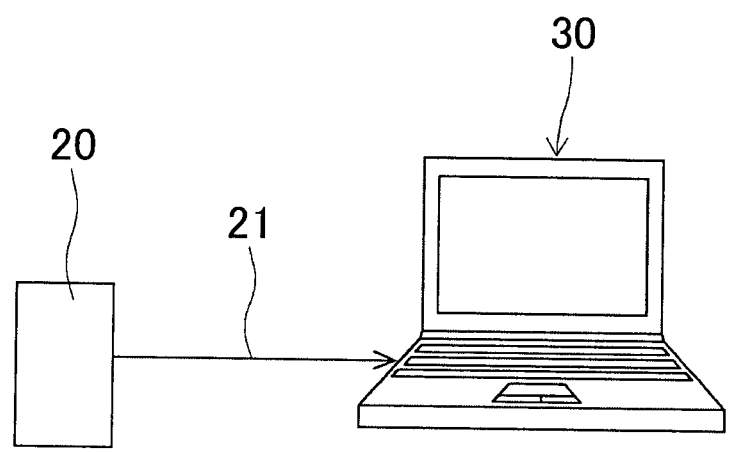
FIG. 1 is an explanatory drawing illustrating the configuration of a device for implementing the axial force measurement method according to the first embodiment.
Figure 1:
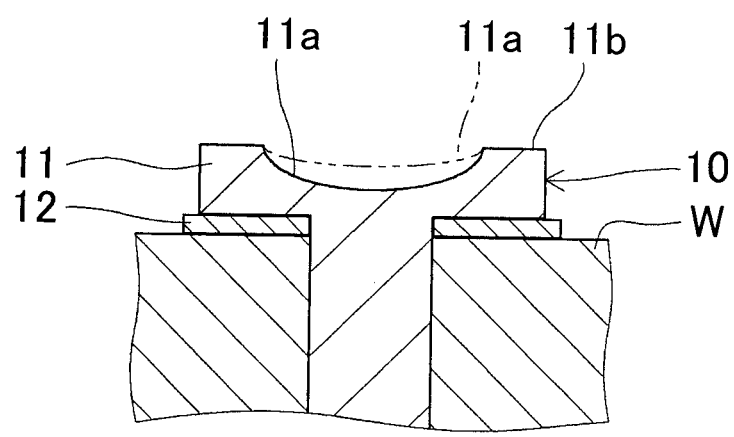

As depicted in FIG. 1, the axial force measurement method serves to measure the axial force of a bolt 10 fastened to an object to be fastened W.

The bolt 10 of the first embodiment is assumed to be a hexagonal bolt in which a recess 11$a$ is formed in the gravity center (center) of a head 11, and an outer end portion is formed as a flat top portion 11$b$. Further, in the bolt 10, a flange 12 is formed below the head 11. The recess 11$a$ is positioned lower than the top portion 11$b$.

When the bolt 10 is fastened, the recess 11$a$ recedes with centering on the gravity center, and the displacement amount of the head 11 increases as the axial force increases (see the recess 11$a$ in a state before the fastening which is indicated by a two-dot chain line in FIG. 1). In other words, there is a correlation between the axial force and the displacement amount of the head 11 before and after the fastening (see FIG. 13).

With the axial force measurement method, the displacement amount of the head 11 is measured, and the axial force is measured on the basis of the displacement amount measurement result and the correlation. In this case, the axial force measurement method significantly differs from the related art in that the displacement amount of the head 11 is measured using image processing.

The bolt which is the measurement object of the axial force measurement method is not limited to the bolt 10 of the first embodiment and may be, for example, a bolt with a flat head. When the axial force of such bolt with a flat head is measured, the top portion to the head is a portion that is not recessed even after the fastening, that is, close to the outer edge portion of the head. Further, the bolt which is the measurement object of the axial force measurement method may or may not have a flange formed thereon.

First, the configuration of the device used for implementing the axial force measurement method will be described below.

In the axial force measurement method, the axial force is measured using a distance sensor 20 and a personal computer 30.

The distance sensor 20 is disposed above the bolt 10, that is, at one side of the head 11, and measures the distance to the head 11 of the bolt 10. The distance sensor 20 thus measures the height of the head 11. The distance sensor 20 is provided with a storage device that stores a program for executing the image processing (the below-described smoothing processing, and the like) with respect to the measurement result on the distance to the head 11, and a computational device for executing the program. The distance sensor 20 is electrically connected to the personal computer 30 and inputs the measurement result into the personal computer 30.

The personal computer 30 is provided with a storage device that stores a program for executing the image processing (the below-described binarization processing and mask processing) and the computational processing for implementing the axial force measurement method, and also a computational device for executing the program. The personal computer 30 stores the correlation of the axial force and the displacement amount of the head 11, that is, the relational expression of such a correlation which is presented in FIG. 13, in the storage device. The personal computer 30 also stores the recession amount of the recess 11$a$ (see the recess 11$a$ depicted by a two-dot chain line in FIG. 1) before the fastening in the storage device.

The procedure of the axial force measurement method will be described below.

Figure 2:
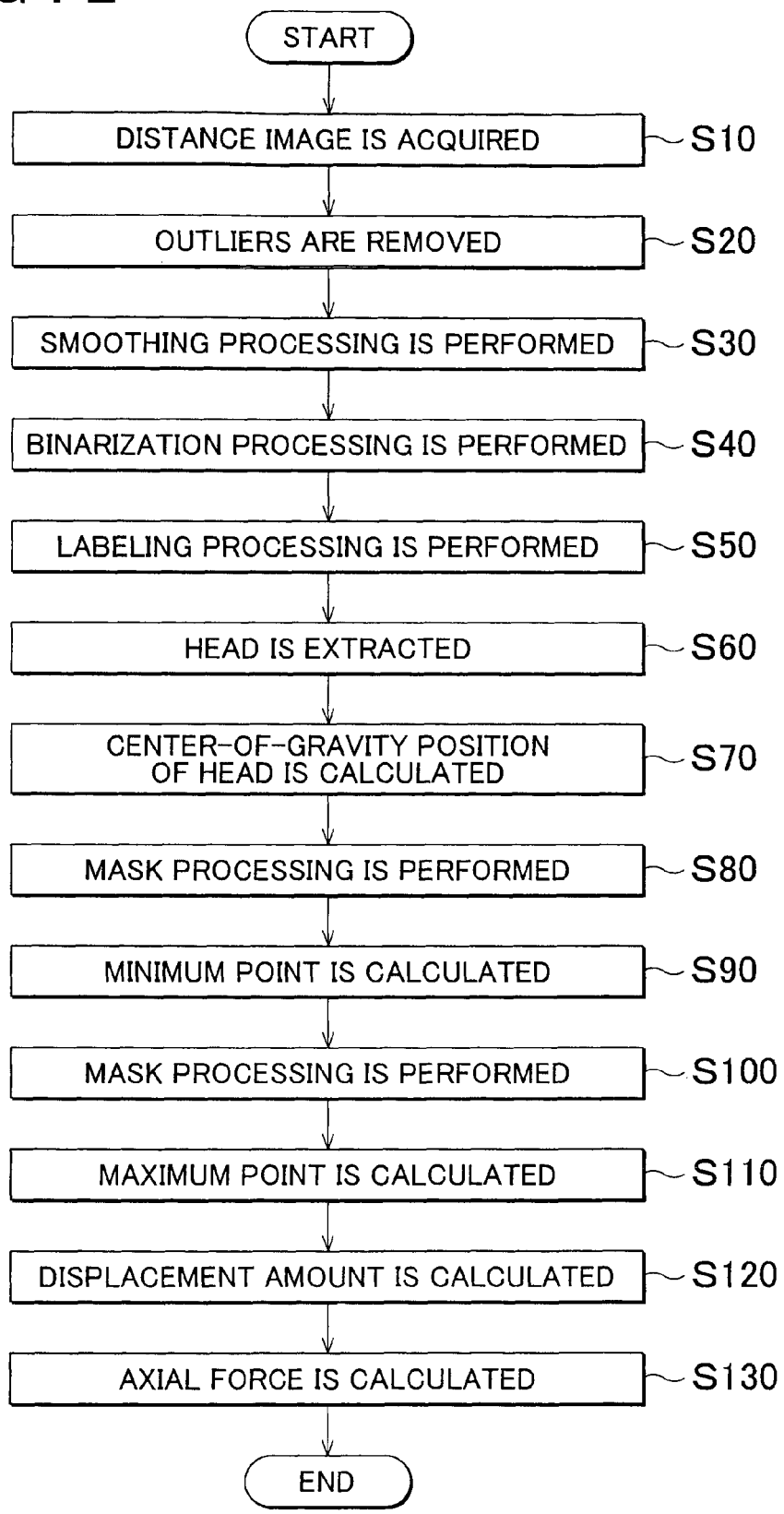
FIG. 2 illustrates the procedure of the axial force measurement method according to the first embodiment.

As depicted in FIGS. 1 and 2, in the axial force measurement method, initially, a step of acquiring the distance image 21 of the head 11 of the bolt 10 fastened to the object to be fastened W is performed with the distance sensor 20 (step S10). In this case, in the axial force measurement method, the height of the head 11 of the bolt 10 is measured, for example, by measuring the height of the head 11 of the bolt 10 while moving the distance sensor 20 in the horizontal direction.

Figure 3:
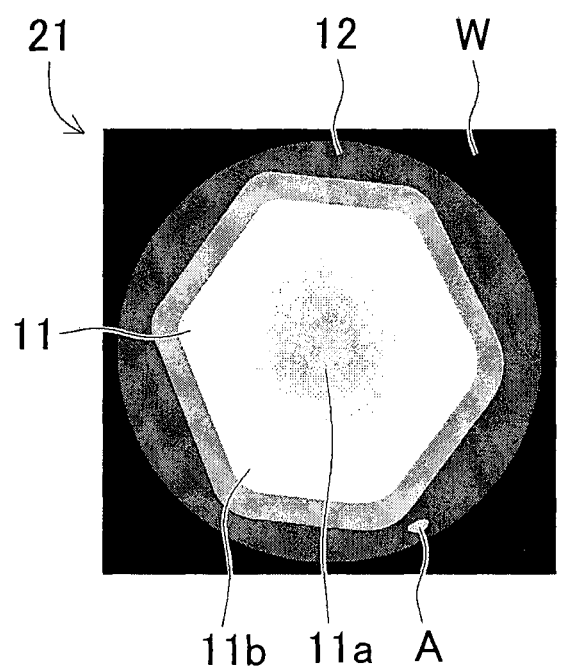
FIG. 3 illustrates a distance image.

As a result, as depicted in FIG. 3, in the axial force measurement method, the distance image 21 with a height in the form of a pixel value is acquired.

In the distance image 21, the height of the head 11 of the bolt 10, the flange 12, and the upper surface of the object to be fastened W is indicated as pixel values. The reference symbol A in FIG. 3 denotes a portion in which the measured height is larger than the actual height under the effect of dirt or the like.

As shown in FIGS. 2 and 3, after the distance image 21 has been acquired, in the axial force measurement method, outliers are removed from the distance image 21 by the distance sensor 20 (S20). In this case, in the axial force measurement method, for example, pixels of a predetermined range are extracted from the distance image 21 and a simple average of the height of the predetermined range is calculated on the basis of the pixel values of the extracted pixels. Further, in the axial force measurement method, pixel values that are at a large distance from the calculated result of the simple average are determined to be outliers and removed from the pixels of the predetermined range.

For the sake of simplicity of explanation, the distance image 21 depicted in FIG. 3 is described as an image from which such outliers have been removed.

After the outliers have been removed, in the axial force measurement method, the distance image 21 from which the outliers have been removed is subjected to smoothing processing with the distance sensor 20 (step S30). The smoothing processing is performed to smooth out the pixel values.

In the axial force measurement method, the smoothing processing performed with respect to the distance image 21 is, for example, the so-called Gauss filter processing in which the pixel value of a pixel of interest and the weighted average value of the pixel values of the pixels surrounding the pixel of interest are taken as the pixel values after the filtering.

In the axial force measurement method, the smoothing processing may be also the so-called median filter processing in which the pixel value of a pixel of interest and the central value of the pixel values of the pixels surrounding the pixel of interest are taken as the pixel values after the filtering.

As a result, in the axial force measurement method, the distance image 21 is acquired from which the surface roughness (fine irregularity) of the head 11 and the measurement error are removed as noise components. As shown in FIG. 1, the distance sensor 20 inputs the distance image 21 subjected to the smoothing processing into the personal computer 30 (see an arrow 21 shown in FIG. 1).

In the axial force measurement method, steps S20 and S30 may be also performed in the personal computer.

Figure 4:
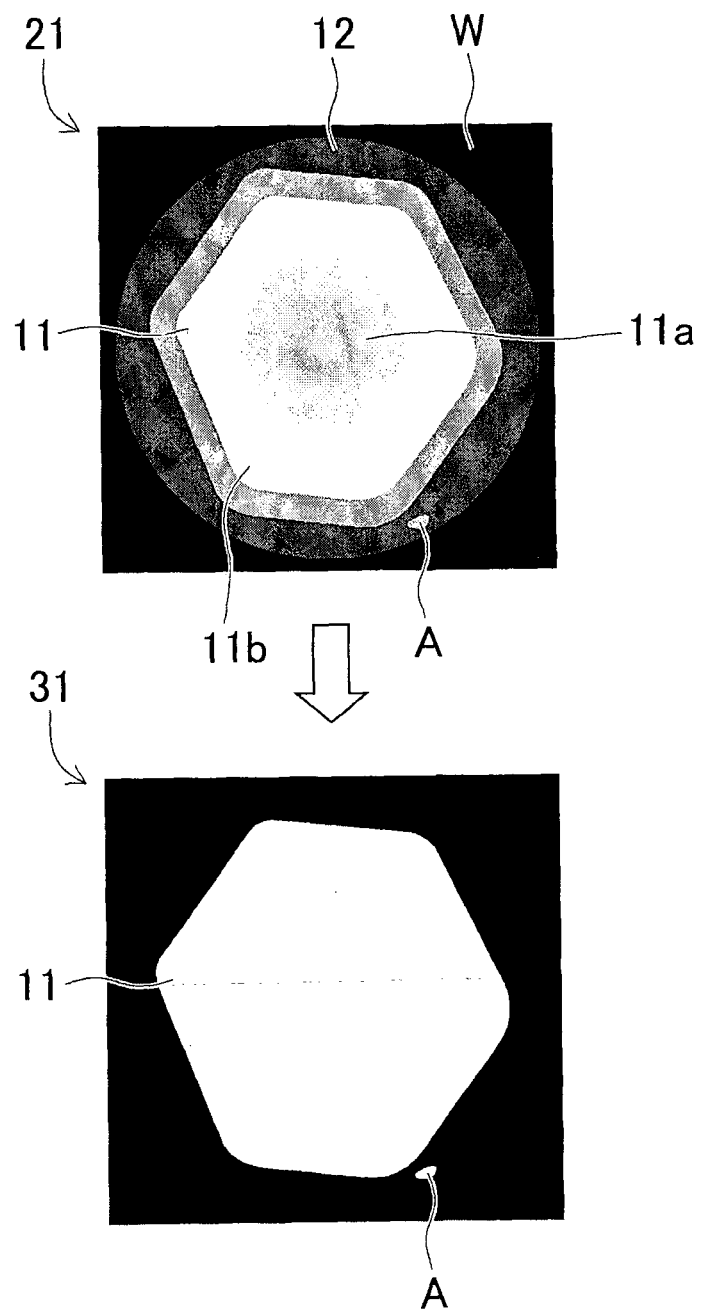
FIG. 4 illustrates a binarized image.

As indicated in FIGS. 2 and 4, after the smoothing processing has been performed with respect to the distance image 21, in the axial force measurement method, the distance image 21 subjected to the smoothing processing is subjected to binarization processing by the personal computer 30 (step S40). In the binarization processing, the distance image 21 is colored in two different colors by using a threshold of pixel values as a reference.

In the axial force measurement method, the threshold of pixel values is set such that the head 11 has one color (for example, a white color) and the flange 12 and the object to be fastened W have the other color (for example, a black color), and the distance image 21 subjected to the smoothing processing is subjected to the binarization processing. Such threshold of pixel values is set on the basis of a test that is performed before the axial force is actually measured.

As a result, in the axial force measurement method, a binarized image 31 is acquired in which the head 11 and portions other than the head 11 are colored in two different colors.

In the first embodiment, it is assumed that the portion A representing the measurement result which is larger than the actual height due to the effect of dirt or the like, has the same color as the head 11 after the binarization processing.

Figure 5:
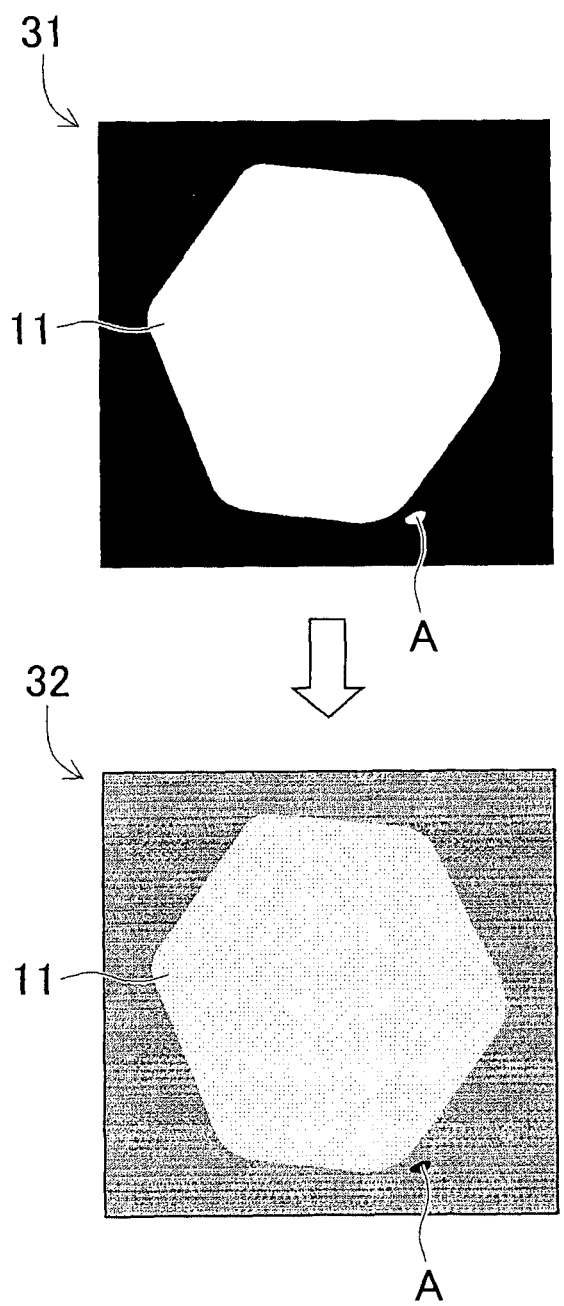
FIG. 5 illustrates a labeling image.

As shown in FIGS. 2 and 5, after the binarization processing, in the axial force measurement method, the binarized image 31 is subjected to labeling processing by the personal computer 30 (step S50). In the labeling processing, the same numbers are allocated to the pixels with the same continuing pixel values, and the pixels are color-coded for each number (by the surface area).

In the axial force measurement method, such labeling processing performed with respect to the binarized image 31 produces the labeling image 32 in which the portion A representing the measurement result which is larger than the actual height due to the effect of dirt or the like, the head 11, and other portions are colored in three different colors.

Figure 6:
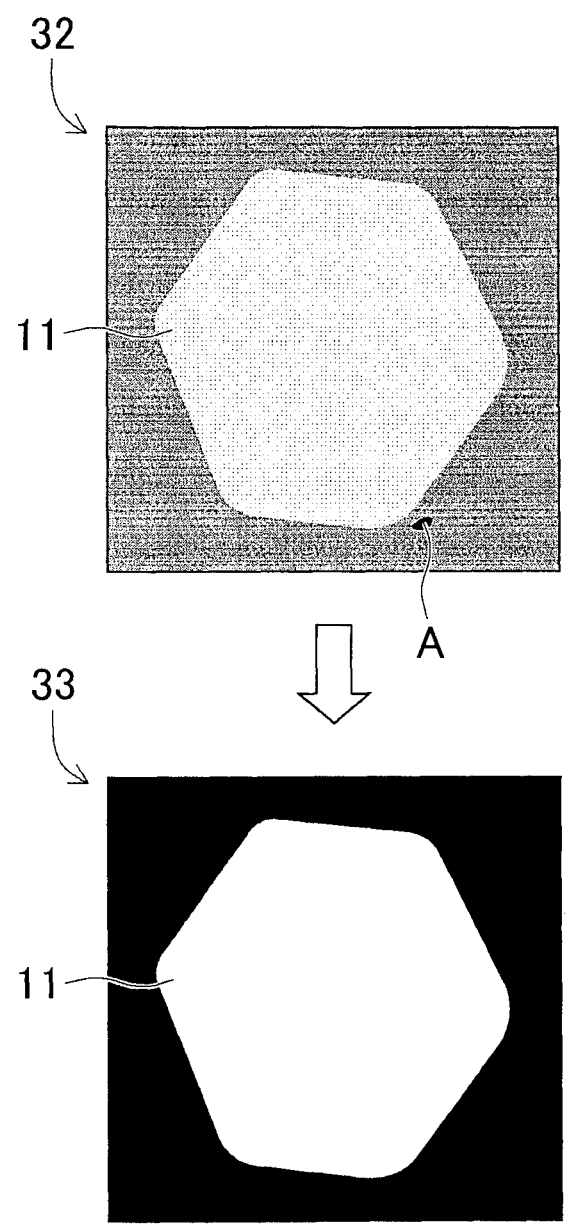
FIG. 6 illustrates a head extraction image.

As depicted in FIGS. 2 and 6, after the labeling processing, in the axial force measurement method, the image of the head 11 is extracted from the labeling image 32 by the personal computer 30 (step S60).

In this case, in the axial force measurement method, the surface area of pixel groups which have been color-coded from the labeling image 32 is calculated and a pixel group of a color for which the calculation result is less than a predetermined surface area is removed. In the axial force measurement method, the pixel group corresponding to the head 11 is determined on the basis of the surface area of the pixel groups and the position thereof. In the axial force measurement method, the processing of changing the pixel value of the pixel group determined to be the head 11 to a white color (that is, 255) and the pixel values of other pixel groups to a black color (that is, 0) is performed with respect to the labeling image 32.

In the axial force measurement method, a head extraction image 33 is created in which the head 11 and other portions are thus colored in two different colors.

As a result, in the axial force measurement method, for example, even when dirt or the like has adhered to the head 11, the image of the head 11 can be extracted by removing the portion to which the dirt or the like has adhered. Therefore, the image of the head 11 can be accurately extracted.

Figure 7:
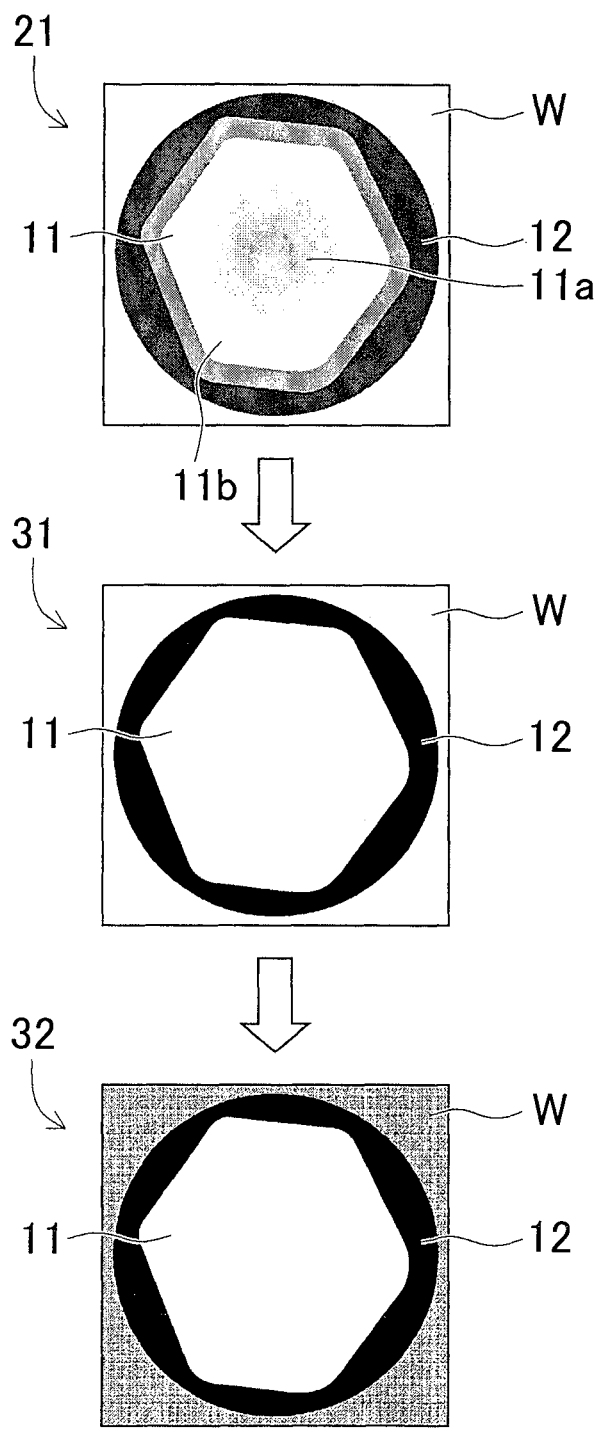
FIG. 7 illustrates the results of labeling processing performed with respect to the distance image obtained by reversing the measurement result of a distance sensor.

In this case, as depicted in FIG. 7, when the measurement range of the distance sensor 20 is exceeded with respect to the flange 12 and the object to be fastened W in the height direction, that is, when the height position of the flange 12 is within the measurement range of the distance sensor 20, but the height position of the object to be fastened W is outside the measurement range of the distance sensor 20, the height of the object to be fastened W can be reversed (becomes larger than the actual height). In the axial force measurement method, where such distance image 21 is subjected to the binarization processing, the binarized image 31 can be created in which the head 11 and the object to be fastened W have the same color.

With the axial force measurement method, even in such a case, the head 11 and portions other than the head 11 can be colored differently by subjecting the binarized image 31 to the labeling processing. Therefore, with the axial force measurement method, the image of the head 11 can be accurately extracted even when the measurement range of the distance sensor 20 is exceeded between the flange 12 and the object to be fastened W.

Figure 8:
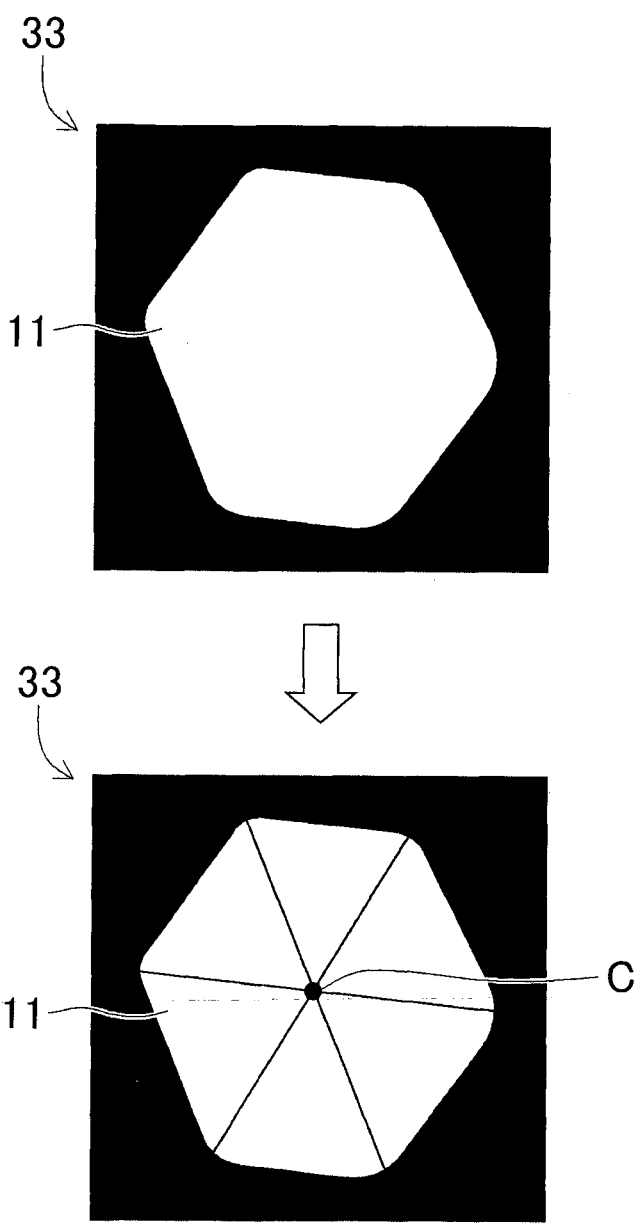
FIG. 8 illustrates the distance image for which the gravity center position of the head has been calculated.

As depicted in FIGS. 2 and 8, after the image of the head 11 has been extracted, in the axial force measurement method, a gravity center position C of the head 11 (that is, a pixel corresponding to the gravity center of the head 11) is calculated by the personal computer 30 from the head extraction image 33 (step S70).

In this case, in the axial force measurement method, for example, three straight lines connecting the opposing apexes of the hexagonal shape of the head 11 are drawn in the head extraction image 33, and the crossing point of the straight lines is calculated as the gravity center position C of the head 11.

In the axial force measurement method, it is not always necessary to draw the three straight lines, and the crossing point of two straight lines connecting the opposing apexes may be also calculated as the gravity center of the head.

Thus, in the axial force measurement method, a step of extracting the image of the head 11 of the bolt 10 from the head extraction image 33 and calculating the gravity center position. C of the head 11 of the bolt 10 is performed.

Further, in the axial force measurement method, it is not always necessary to subject the binarized image to the labeling processing. In other words, in the axial force measurement method, the image of the head of the bolt may be extracted from the binarized image 31 created in step S40 or the head extraction image 33 created in step S60.

However, in the axial force measurement method, it is preferred that the head extraction image 33 be used when extracting the image of the head of the bolt, as in the first embodiment. As a result, in the axial force measurement method, the gravity center position of the head can be calculated by removing the portion representing the measurement result which is larger than the actual height due to the effect of dirt or the like, and therefore the gravity center position can be calculated more accurately.

Figure 9:
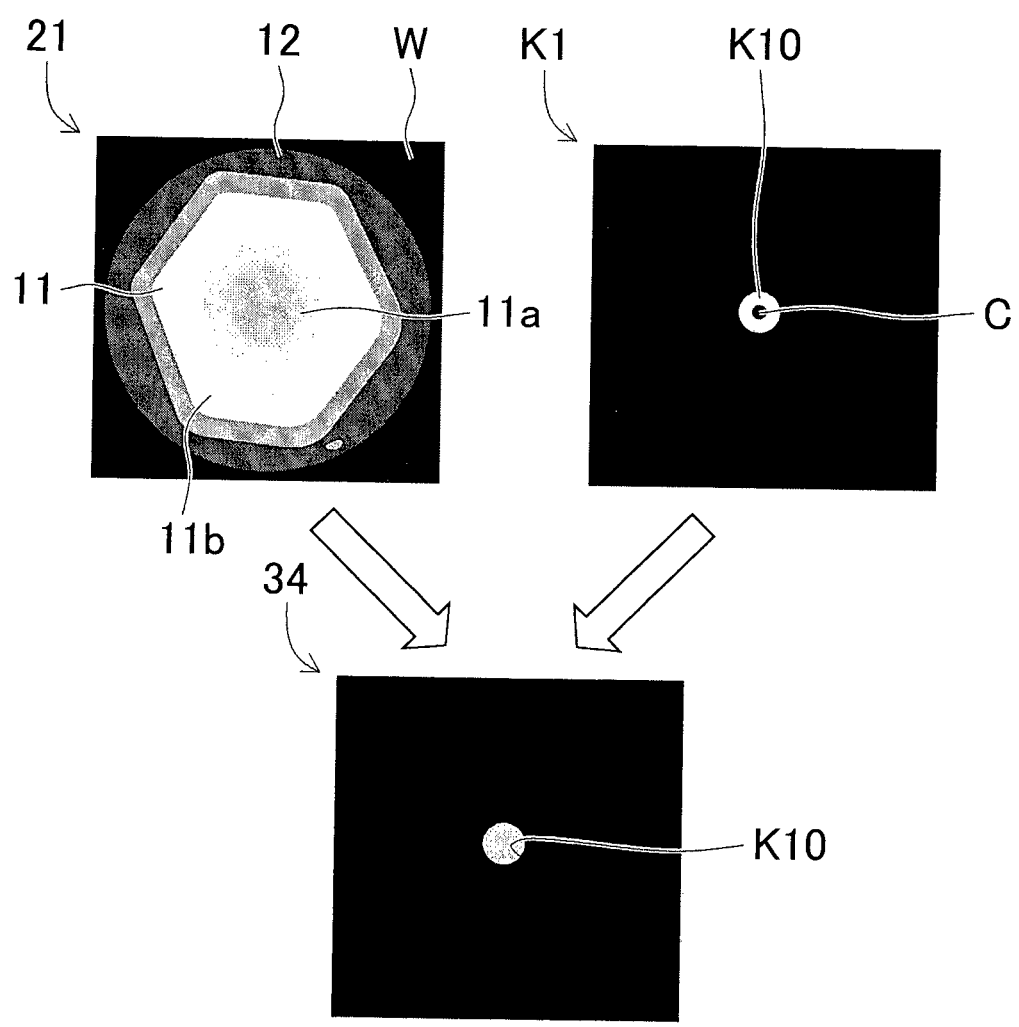
FIG. 9 illustrates a mask image for calculating the minimum point.

As depicted in FIGS. 2 and 9, after the gravity center position C has been calculated, in the axial force measurement method, the distance image 21 subjected to the smoothing processing is subjected to the mask processing by the personal computer 30 (step S80). The mask processing is the processing of displaying one part of an image and not displaying, that is, hiding, another part of the image.

In the axial force measurement method, a reference image K1 is created in which a minimum circle K10 centered on the gravity center position C of the head 11 is drawn. In the reference image K1 in step S80, the outside of the minimum circle K10 is blackened. Thus, the reference image K1 in step S80 serves to hide the portion outside the minimum circle K10.

The minimum circle K10 of the reference image K1 is less than the recess 11a.

In the reference image K1 depicted in FIG. 9, the black circle indicating the gravity center position C is presented for the sake of convenience in order to indicate the gravity center position C. In other words, the actual reference image is the image obtained by removing the black circle indicating the gravity center position C from the reference image K1 depicted in FIG. 9.

In the axial force measurement method, the reference image K1 is overlapped on the distance image 21 subjected to the smoothing processing and a mask image 34 is created in which only the pixels positioned inside the minimum circle K10 are displayed in the distance image 21 subjected to the smoothing processing.

As a result, in the axial force measurement method, only the pixels positioned inside the minimum circle K10 are extracted from the distance image 21 subjected to the smoothing processing.

After the mask processing has been performed, in the axial force measurement method, a minimum point is calculated by the personal computer 30 from the pixel values of the pixels of the distance image 21 that has been subjected to the mask processing and extracted, that is, has been continuously displayed in the mask image 34 (step S90).

In the first embodiment, the minimum point is the height of the head 11 in the periphery of the gravity center, that is, the height of the most receding portion (located at a low position) in the head 11 at the time of fastening.

As mentioned hereinabove, the minimum circle K10 of the reference image K1 is a circle centered on the gravity center position C of the head 11. Therefore, each pixel of the distance image 21 that has been continuously displayed in the mask image 34 corresponds to the measurement result of the height of the head 11 in the periphery of the gravity center.

Accordingly, in the axial force measurement method, a simple average of the height of the pixels of the distance image 21 that has been continuously displayed in the mask image 34, that is, the pixels positioned inside the minimum circle K10, is calculated. In the axial force measurement method, the result of calculating such a simple average is taken as the minimum point.

In other words, in the axial force measurement method, not only the height of the gravity center of the head 11, that is, the height of only one point, but also the height of the periphery of the gravity center of the head 11, is the minimum point calculation object.

As a result, in the axial force measurement method, even when the calculated gravity center position C shifts with respect to the actual gravity center position, the error in calculation of the minimum point can be reduced. Further, in the axial force measurement method, even when small irregularity is formed in the periphery of the gravity center of the head 11, a variation in the minimum point caused by the irregularity can be reduced. In other words, in the axial force measurement method, the height of the minimum point can be measured accurately and stably.

Thus, in the axial force measurement method, a step of calculating the average value of the height of the pixels positioned inside the minimum circle K10 as the minimum point is performed.

The size of the minimum circle in step, S80 is not particularly limited, provided that it is sufficiently large not to exceeds the range of the head, but a circle disposed inside the recess, for example, a circle with a radius of about several millimeters is preferred. With such a size, in the axial force measurement method, the height of the gravity center position periphery can be calculated more accurately.

Figure 10:
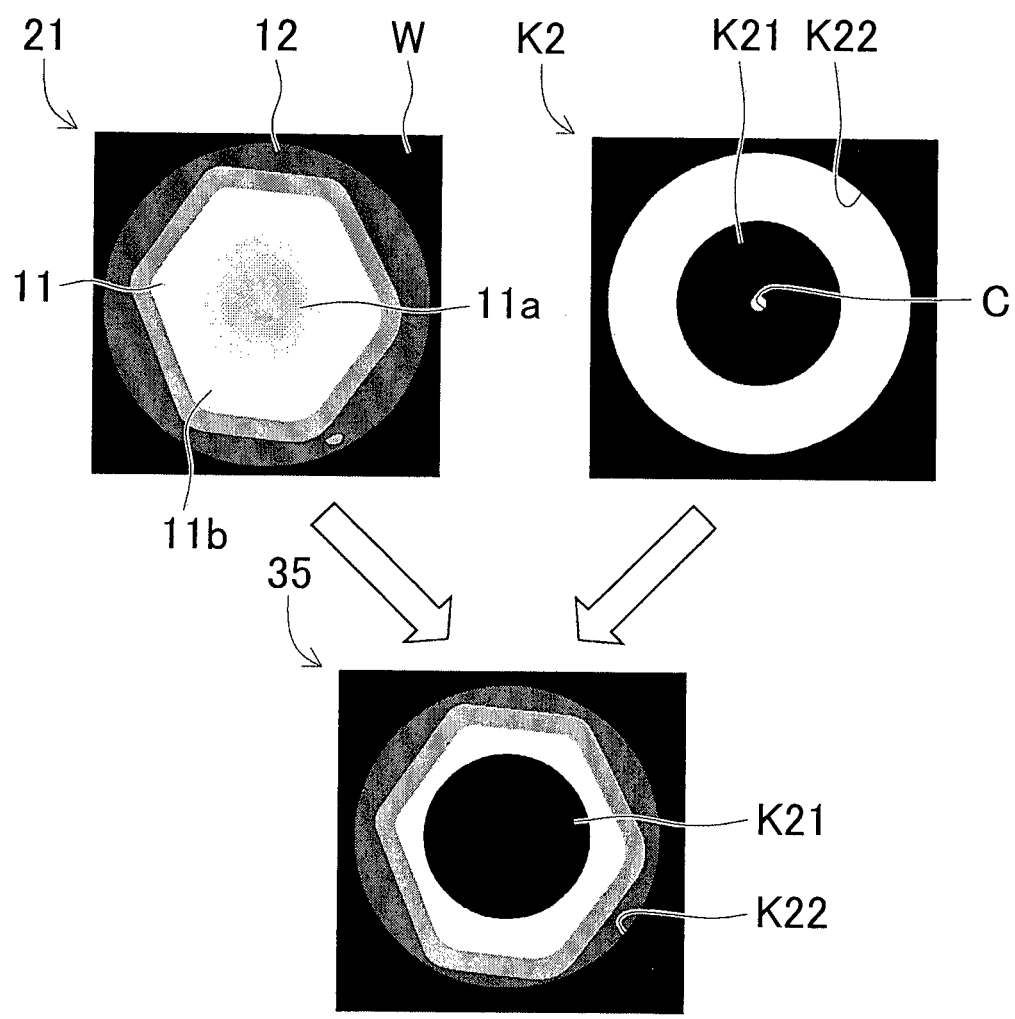
FIG. 10 illustrates a mask image for calculating the maximum point.

As depicted in FIGS. 2 and 10, after the minimum point has been calculated, in the axial force measurement method, the personal computer 30 subjects the distance image 21 that has been subjected to the smoothing processing, to the mask processing that differs in the processing contents from the processing of step S80 (step S100).

At this time, in the axial force measurement method, a reference image K2 is created that includes a first circle K21 which is larger than the minimum circle K10 of the reference image K1 and centered on the gravity center position C of the head 11, and a second circle K22 which is larger than the first circle K21 and centered on the gravity center position C of the head 11. In the reference image K2 in step S100, the inside of the first circle K21 the outside of the second circle K22 are both blackened. In other words, the reference image K2 in step S100 serves to hide the zone inside the first circle K21 and the zone outside the second circle K22.

The first circle K21 is less than the head 11. In other words, the first circle K21 is less than the entire head 11 by the portion thereof that is not blackened. It is particularly preferred that the size of such first circle K21 be about the size of the recess 11a.

The second circle K22 is larger than the head 11 and less than the flange 12. It is particularly preferred that the size of such second circle K22 be about the size of the circumscribed circle of the head 11.

In the reference image K2 depicted in FIG. 10, a white circle indicating the gravity center position C is presented for the sake of convenience in order to indicate the gravity center position C. In other words, the actual reference image is the image obtained by removing the white circle indicating the gravity center position C from the reference image K2 depicted in FIG. 10.

In the axial force measurement method, the reference image K2 is overlapped on the distance image 21 subjected to the smoothing processing and a mask image 35 is created in which only the pixels positioned between the circles K21 and K22 are displayed in the distance image 21 subjected to the smoothing processing.

As a result, in the axial force measurement method, only the pixels positioned outside the first circle K21 and inside the second circle K22 are extracted from the distance image 21 subjected to the smoothing processing.

After the mask processing has been performed, in the axial force measurement method, a maximum point is calculated by the personal computer 30 from the distance image 21 that has been subjected to the mask processing and extracted, that is, has been continuously displayed in the mask image 35 (step S110).

In the first embodiment, the maximum point is the height of, the top portion 11b of the head 11, that is, the height of the portion that does not recede at the time of fastening.

As mentioned hereinabove, the first circle K21 is greater than the minimum circle K10 in the mask image 34 and disposed inside the head 11. The second circle K22 is disposed outside the head 11. Therefore, the pixels of the distance image 21 that has been continuously displayed in the mask image 35 correspond to the measurement results on the height of the outer edge of the recess 11a, top portion 11b, and flange 12.

Figure 11:
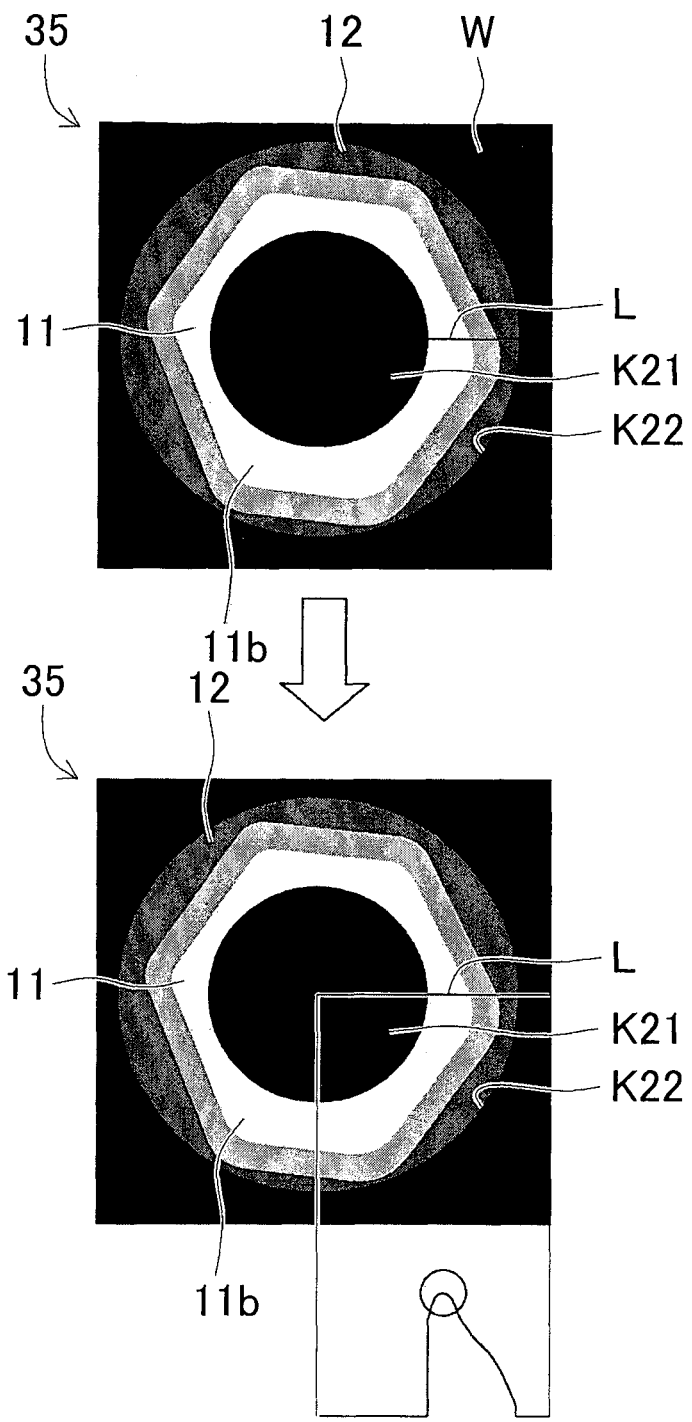
FIG. 11 illustrates the extraction of pixels with a relatively large height among the pixels positioned on the virtual straight lines from the mask image.

As depicted in FIG. 11, in the axial force measurement method, pixels positioned on a virtual straight line L extending outward from the gravity center position C are extracted from the pixels extracted by performing the mask processing. Then, in the axial force measurement method, a plurality (for example, 30) of pixels with a relatively large height is extracted on the basis of the pixel values of the extracted pixels (see the circle depicted below mask image 35 on the lower side in FIG. 11). In this case, from the pixels extracted on the virtual straight line L, a plurality of pixels, the heights of which are arranged in descending order from the largest height, can be extracted as the pixels with a large height.

The curve depicted in the lower end portion of FIG. 11 represents the height of the pixel values positioned on the virtual straight line L. The height is shown to increase in the upward direction in FIG. 11.

As indicated in FIG. 12, in the axial force measurement method, pixels positioned on a plurality of virtual straight lines L extending at a constant angular interval (for example, 1°) are extracted and the aforementioned processing of "extracting a plurality of pixels with a relatively large height from the extracted pixels positioned on the virtual straight line L" is implemented with respect to each virtual straight line L.

In FIG. 12, the angular interval of the virtual straight lines L is 20°, so that the mask image 35 could be easily seen.

Thus, in the axial force measurement method, the pixels of the top portion 11b are extracted from the mask image 35 by extracting a plurality of pixels with a large height that are positioned on the virtual straight lines L, this processing being performed with respect to a plurality of virtual straight lines L extending at a constant angular interval. In the axial force measurement method, the simple average of the height of the extracted pixels is calculated and the calculation result is taken as the maximum point. More specifically, the maximum point is calculated by calculating the simple average of the height of the pixels extracted on the virtual straight lines L (simple average of the pixels for each virtual straight line L), and further calculating the simple average of the simple average values relating to each virtual straight line L.

In other words, in the axial force measurement method, the entire periphery of the top portion 11b is taken as the maximum point calculation object, instead of calculating the height of very few locations, that is, one or two points of the top portion 11b.

As a result, in the axial force measurement method, the variation of the maximum point can be reduced even when the phase of the head 11 is different or when small irregularity has been formed on the top portion 11b. In other words, in the axial force measurement method, the maximum point can be measured accurately and stably.

Thus, the axial force measurement method includes a step of extracting the pixels with a large height on the basis of the pixel values of the pixels of the distance image 21 and calculating the average value of the height of the extracted pixels with a large height as the maximum point.

Further, in the axial force measurement method, it is not always necessary to perform the mask processing with respect to the distance image 21 when the maximum point is calculated. In other words, in the axial force measurement method, the pixels positioned on the virtual straight lines L may be extracted from the distance image 21.

However, in the axial force measurement method, it is preferred that the pixels positioned on the virtual straight lines L be extracted from the mask image, as in the first embodiment. As a result, the extraction of small protruding portions formed close to the outer edge of the recess at the time the maximum point is calculated can be prevented. Therefore, the maximum point can be calculated more accurately in this axial force measurement method. Therefore, in the axial force measurement method, in particular, when the axial force of a bolt with a flat head is measured, the height of the maximum point can be measured more accurately and stably.

As shown in FIG. 2, after the maximum point has been calculated, in the axial force measurement method, a step of calculating the displacement amount of the head 11 is performed by the personal computer 30 on the basis of the difference between the calculation result on the minimum point and the calculation result on the maximum point (step S120).

At this time, in the axial force measurement method, the displacement amount of the head 11 is calculated by calculating the difference between the calculation result on the minimum point and the calculation result on the maximum point and by calculating the difference between the calculation result on the difference between the minimum point and the maximum point, and the recession amount of the head 11 before the fastening which has been calculated in advance (heightwise dimension from the top portion 11b to the bottom of the recess 11a).

In the axial force measurement method, the displacement amount of the head 11 can be calculated on the basis of the minimum point and maximum point that are calculated accurately and stably. Therefore, in the axial force measurement method, the displacement amount of the head 11 can be calculated accurately and stably.

Figure 13:
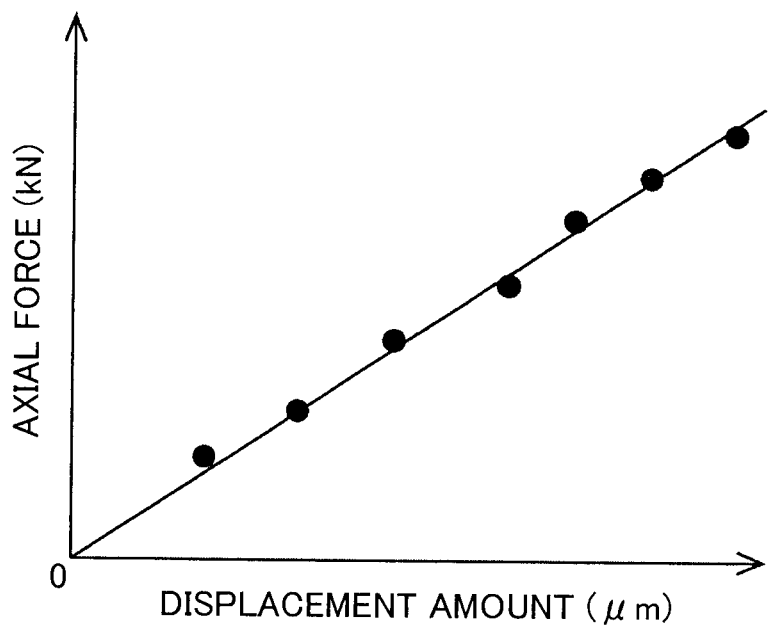
FIG. 13 illustrates the relationship between the axial force and the displacement amount of the head.

As depicted in FIGS. 2 and 13, after the displacement amount of the head 11 has been calculated, in the axial force measurement method, a step of calculating the axial force is performed by the personal computer 30 (step S130). In this case, in the axial force measurement method, the axial force is calculated by substituting the calculation result on the displacement amount of the head 11 into a pre-calculated relational expression of an axial force and the displacement amount of the head 11.

In the axial force measurement method, the displacement amount of the head 11, which is calculated accurately and stably, is substituted into the relational expression of the, axial force and the displacement amount of the head 11. Therefore, with the axial force measurement method, even when small irregularity has been formed on the periphery of the gravity center and the top portion 11b of the head 11, a displacement amount which is significantly different from the actual displacement amount can be prevented from being substituted into the relational expression of the axial force and the displacement amount of the head 11. Therefore, with the axial force measurement method, the axial force can be measured accurately and stably.

The order of calculating the, minimum point and maximum point is not limited to that of the first embodiment, and the minimum point may be calculated after calculating the maximum point.

The procedure for calculating the relational expression of the axial force and the displacement amount of the head 11 will be explained hereinbelow. Initially, the configuration of the device to be used for calculating the relational expression of the axial force and the displacement amount of the head 11 will be explained.

Figure 14:
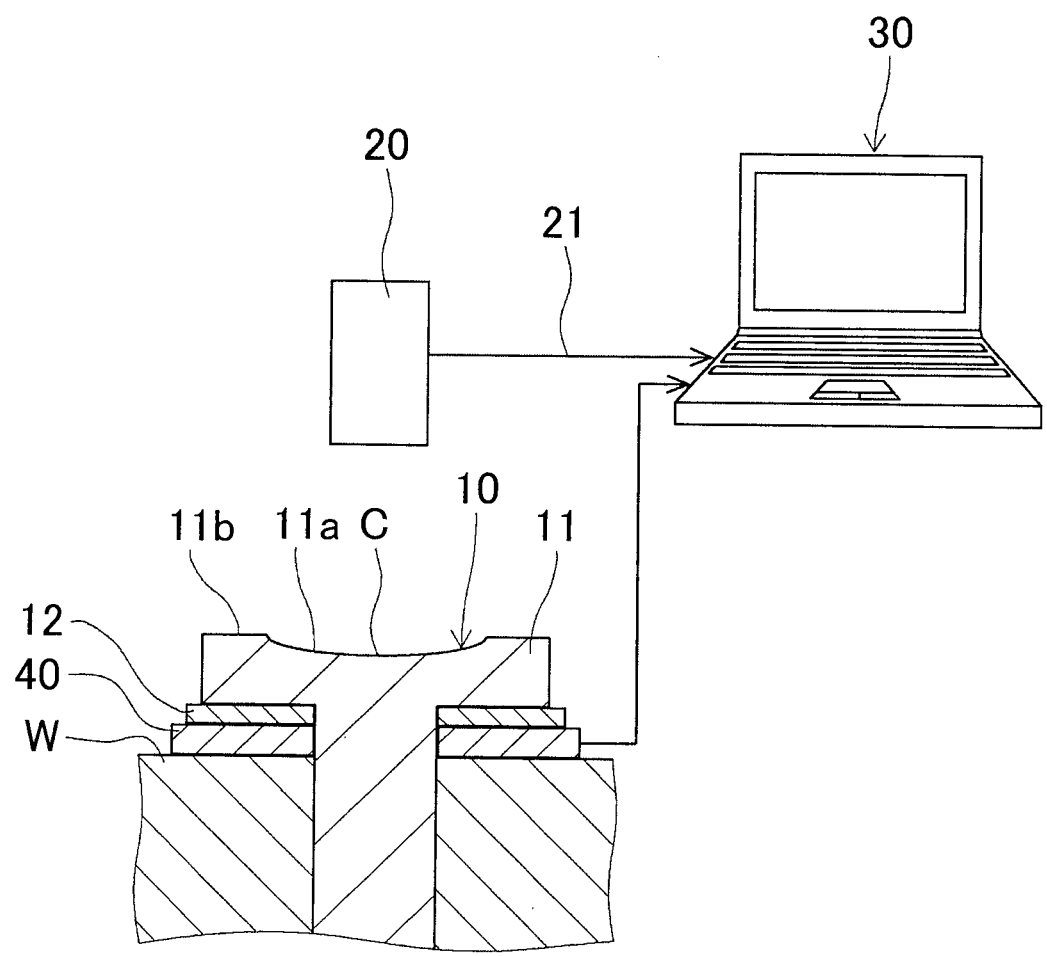
FIG. 14 illustrates the configuration of a device for acquiring the relationship between the axial force and the displacement amount of the head.

As depicted in FIG. 14, in the axial force measurement method, the relational expression of the axial force and the displacement amount of the head 11 is calculated using the distance sensor 20, the personal computer 30, and a load cell 40. The distance sensor 20 and the personal computer 30 are the distance sensor 20 and the personal computer 30 that are used when measuring the axial force. The personal computer 30 stores in the storage device a program for executing the calculation processing for calculating the, relational expression of the axial force and the displacement amount of the head 11.

The load cell 40 is interposed between the bolt 10 and the object to be fastened W and measures the axial force. The load cell 40 is electrically connected to the personal computer 30 and inputs the measurement result on, the axial force into the personal computer 30 (see the arrow indicating the load cell 40 in FIG. 14).

The procedure for calculating the relational expression of the axial force and the displacement amount of the head 11 will be explained hereinbelow.

In the axial force measurement method, the relational expression of the axial force and the displacement amount of the head is calculated at a timing at which the relational expression of the axial force and the displacement amount of the head of the bolt, which is the axial force measurement object, can change, for example, when the material and type of the bolt are changed.

Figure 15:
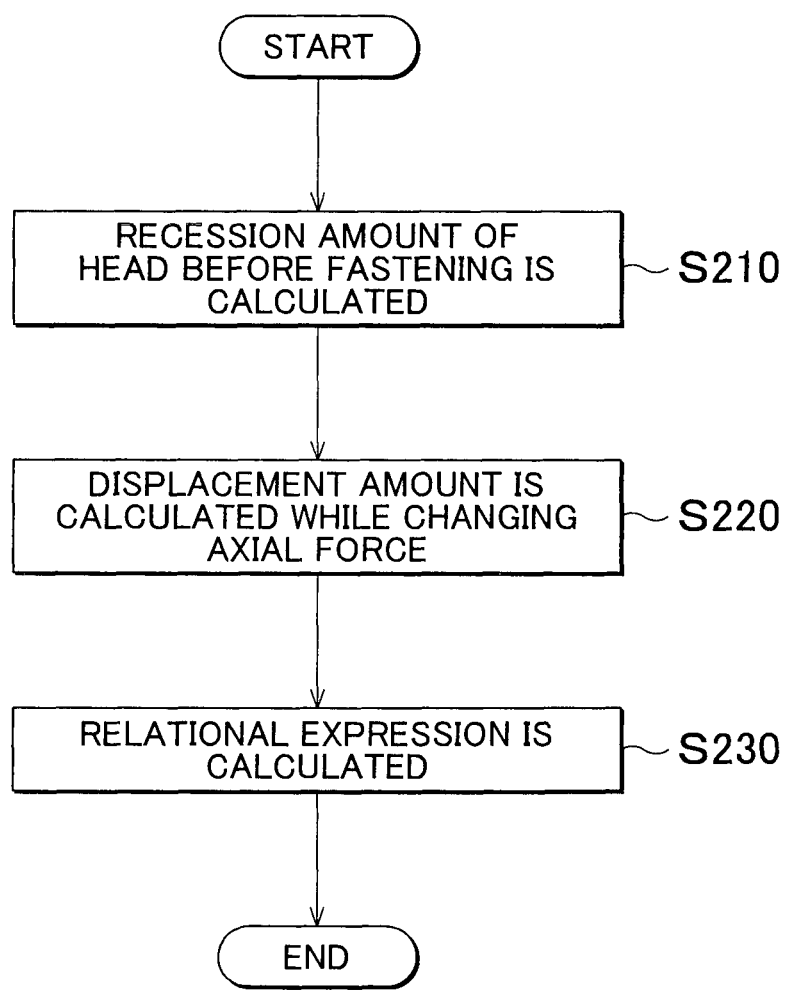
FIG. 15 illustrates the procedure for acquiring the relationship between the axial force and the displacement amount of the head.

As depicted in FIGS. 14 and 15, in the axial force measurement method, the recession amount of the head 11 before the fastening is calculated by the personal computer 30 (step S210).

At this time, in the axial force measurement method, steps S10 to S110, which are preformed when the axial force is measured, are performed in a state in which the measurement result of the load cell 40 is 0 kN, that is, a state in which no axial force has occurred. As a result, in the axial force measurement method, the minimum point and maximum point of the bolt 10 before the fastening are calculated. Further, in the axial force measurement method, the recession amount of the head 11 before the fastening is calculated by calculating the difference between the calculation result on the minimum point and the calculation result on the maximum point. In the axial force measurement method, the calculation result on the recession amount of the head 11 before the fastening is stored in the storage device of the personal computer 30.

The recession amount of the head 11 before the fastening, which is calculated in such step S210, is used as the recession amount of the head 11 before the fastening when actually calculating the displacement amount of the head 11 (step S130).

As a result, in the axial force measurement method, the displacement amount of the head 11 before the fastening can be calculated correctly and stably.

In the axial force measurement method, step S210 is performed, as appropriate, and the recession amount of the head 11 before the fastening is acquired at a timing at which the recession amount of the head 11 before the fastening of the bolt 10, which is the axial force measurement object, can change, for example, when the lot of bolts 10 is changed.

After the recession amount of the head 11 before the fastening has been calculated, in the axial force measurement method, the displacement amount of the head 11 is calculated by the personal computer 30 (step S220).

At this time, in the axial force measurement method, steps S10 to S120, which are performed when the axial force is measured, are performed in a state in which the bolt 10 is fastened to the object to be fastened W and the axial force is generated. As a result, in the axial force measurement method, the displacement amount of the head 11 is calculated.

In the axial force measurement method, the measurement result of the load cell 40 and the calculation result on the displacement amount of the head 11 are stored in association with each other in the storage device of the personal computer 30.

In the axial force measurement method, such calculations of the displacement amount of the head 11 are repeated a plurality of times while changing the axial force.

As a result, with the axial force measurement method, the relationship between the axial force and the displacement amount, of the head 11 can be acquired accurately and stably.

After the displacement amount of the head 11 at the time of fastening has been calculated, in the axial force measurement method, the relational expression of the axial force and the displacement amount of the head 11 is calculated by the personal computer 30 (step S230).

At this time, in the axial force measurement method, the relationship between the axial force (that is, the measurement result of the load cell 40) and the displacement amount of the head 11, which has been acquired in step S220, (see the black circles in FIG. 13) is arranged on a graph in which the displacement amount of the head 11 is plotted against the abscissa and the axial force is plotted against the ordinate. Further, in the axial force measurement method, the relation between the axial force and the displacement amount of the head 11 is acquired by approximating the measurement results on the axial force and the displacement amount of the head 11, with a monomial.

As a result, in the axial force measurement method, the relational expression of an axial force and the displacement amount of the head 11 can be calculated accurately and stably. Therefore, in the axial force measurement method, the axial force can be measured accurately and stably.

The axial force measurement method of the second embodiment will be explained below.

In the axial force measurement method of the second embodiment, the contents of the mask processing performed during the calculation of the maximum point and the calculation contents of the maximum point are different from those of the axial force measurement method of the first embodiment. Therefore, the step of implementing the mask processing and the step of calculating the maximum point (steps corresponding to steps S100 and S110 of the first embodiment) will be described hereinbelow in detail, and the explanation of other steps will be omitted.

Figure 16:
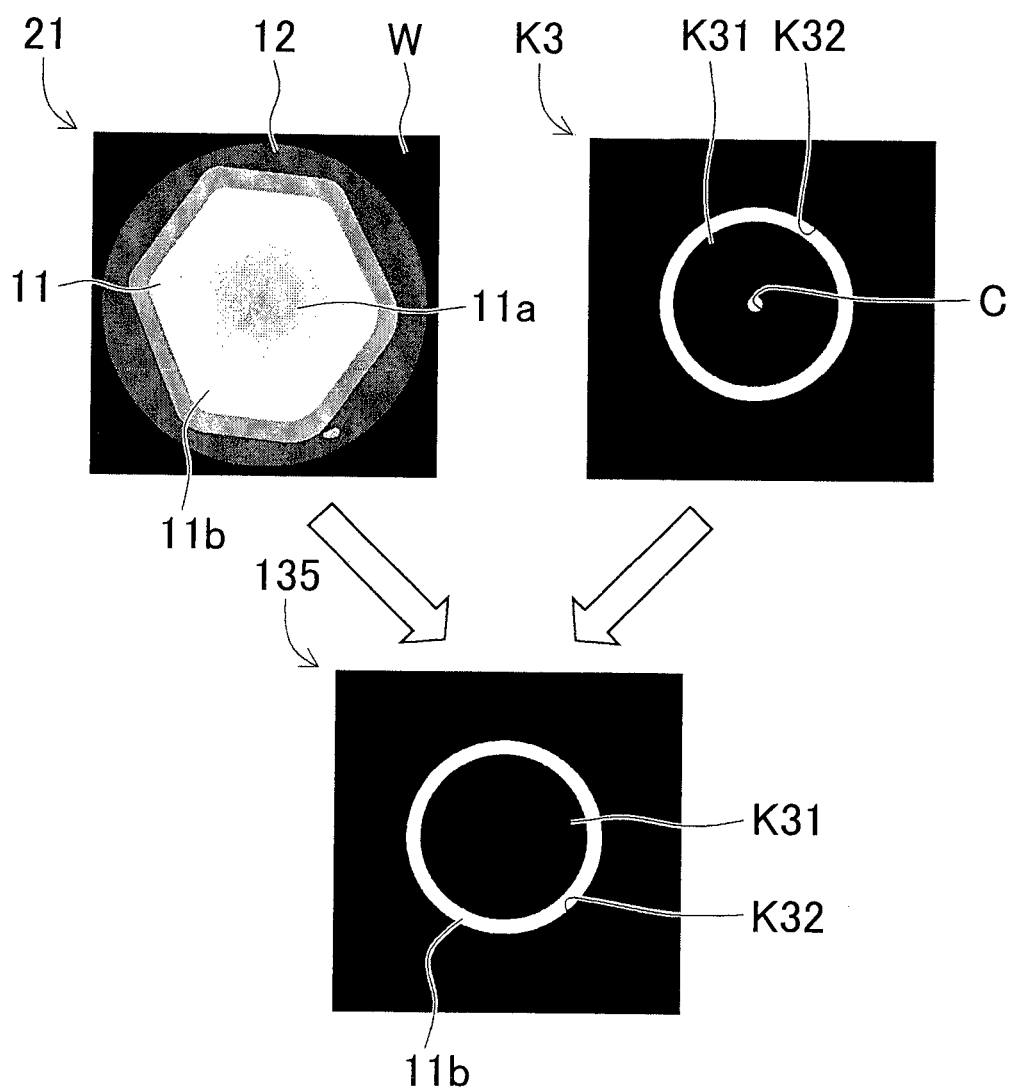
FIG. 16 illustrates a mask image for calculating the maximum point in the second embodiment.

As depicted in FIG. 16, in the axial force measurement method of the second embodiment, a reference image K3 is created, which includes a first circle K31 which is identical to the first circle K21 of the first embodiment and centered on the gravity center position C of the head 11 of the bolt 10 and a second circle K32 which is less than the second circle K22 of the first embodiment and centered on the gravity center position C of the head 11 of the bolt 10. In the reference image K3, the inside of the first circle K31 and the outside of the second circle K32 are both blackened. In other words, the reference image K3 is an image for hiding a range which is wider than that of the axial force measurement method of the first embodiment (see FIG. 11).

The second circle K32 is larger than the first circle K31 and less than the head 11 extracted in step S60. It is preferred that the size of such second circle K32 be about that of the inscribed circle of the head 11.

In the reference image K3 depicted in FIG. 16, the white circle indicating the gravity center position C is presented for the sake of convenience in order to indicate the gravity center position C. In other words, the actual reference image is the image obtained by removing the white circle indicating the gravity center position C from the reference image K3 depicted in FIG. 16.

In the axial force measurement method, the reference image K3 is overlapped on the distance image 21 subjected to the smoothing processing, and a mask image 135 is created in which only the pixels positioned between the circles K31 and K32 are displayed in the distance image 21 subjected to the smoothing processing. In other words, in the axial force measurement method of the second embodiment, the mask image 135 is created with a displayed range narrower than that in the first embodiment.

The first circle K31 is smaller than the head 11. The second circle K32 is as small as the inscribed circle of the head 11. Thus, in the axial force measurement method of the second embodiment, only the pixels close to the outer edge of the top portion 11b are extracted.

In the axial force measurement method of the second embodiment, the mask processing is thus implemented on the distance image 21, and the pixels positioned outside the first circle K31 and also positioned inside the second circle K32 are extracted as the pixels with a large height.

After the mask processing has been performed, in the axial force measurement method, a simple average of the height of the pixels extracted by performing the mask processing, that is, the pixels of the distance image 21 that has been continuously displayed in the mask image 135, is calculated by the personal computer 30 as the maximum point.

In other words, in the axial force measurement method of the second embodiment, the average value of the height of all of the pixels close to the outer edge of the top portion 11b is taken as the height of the maximum point.

As a result, in the axial force measurement method, the variation of the maximum point can be reduced, regardless of the phase of the head 11, or the presence or absence of small irregularity formed on the top portion 11b. Thus, in the axial force measurement method, the maximum point can be measured accurately and stably. Therefore, in the axial force measurement method, the axial force can be measured accurately and stably.

Further, in the axial force measurement method, the maximum point can be acquired without using the virtual straight lines extending outward from the gravity center position C. Therefore, the processing for measuring the axial force can be simplified.

Further, in the axial force measurement method of the second embodiment, the recession amount of the head 11 before the fastening is acquired in advance by using the axial force measurement method of the second embodiment. Furthermore, in the axial force measurement method of the second embodiment, the relational expression of the axial force and the displacement amount of the head 11 is acquired in advance by using the axial force measurement method of the second embodiment.

As a result, in the axial force measurement method, the axial force can be measured using the displacement amount of the head 11 before the fastening that has been calculated accurately and stably and the relational expression of the axial force and the displacement amount of the head 11. Therefore, in the axial force measurement method, the axial force can be measured accurately and stably.

The invention claimed is:

1. An axial force measurement method for measuring an axial force of a bolt fastened to an object to be fastened, comprising:
    acquiring a distance image with a height as a pixel value by measuring a height of a head of the bolt with a distance sensor;
    calculating a gravity center position of the head of the bolt by subjecting the distance image to binarization processing to acquire a binarized image and extracting an image of the head of the bolt from the binarized image;
    calculating an average value of a height of pixels positioned inside a minimum circle as a minimum point by subjecting the distance image to mask processing and extracting only pixels positioned inside the minimum circle centered on the gravity center position of the head of the bolt;
    calculating an average value of the height of extracted pixels with a relatively large height as a maximum point by extracting pixels with the relatively large height from the pixels of the distance image on the basis of the pixel value of the pixel;
    calculating a displacement amount of the head of the bolt on the basis of a difference between a calculation result on the minimum point and a calculation result on the maximum point; and calculating an axial force by substituting the calculation result on the displacement amount of the head of the bolt into a pre-calculated relational expression of an axial force and the displacement amount of the head of the bolt.

2. The axial force measurement method according to claim 1, wherein when the maximum point is calculated, the pixels with the relatively large height are extracted from the extracted pixels on the basis of the pixel value of the pixel by extracting pixels positioned on a virtual straight line from the distance image, the virtual straight line extending at a constant angular interval from the gravity center position of the head of the bolt toward the outside of the bolt.

3. The axial force measurement method according to claim 2, wherein when the maximum point is calculated, pixels are extracted by subjecting the distance image to mask processing, the pixels to be extracted being positioned outside a first circle which is centered on the gravity center position of the head of the bolt, the first circle being larger than the minimum circle, and the pixels to be extracted also being positioned inside a second circle which is centered on the gravity center position of the head of the bolt, the second circle being larger than the first circle, and the pixels positioned on the virtual straight line are extracted from the extracted pixels.

4. The axial force measurement method according to claim 1, wherein when the maximum point is calculated, pixels are extracted as pixels with the relatively large height from the pixels by subjecting the distance image to mask processing, the pixels to be extracted being positioned outside a first circle which is centered on the gravity center position of the head of the bolt, the first circle being larger than the minimum circle, and the pixels to be extracted also being positioned inside a second circle which is centered on the gravity center position of the head of the bolt, the second circle being larger than the first circle and the second circle being smaller than the head of the bolt.

5. The axial force measurement method according to claim 1, wherein the minimum circle is smaller than a recess of the head of the bolt, the recess being formed in the gravity center position of the head of the bolt.

* * * * *